United States Patent Office 3,331,857
Patented July 18, 1967

3,331,857
PHENOLPHTHALEIN MONOPHOSPHATE
DERIVATIVES
Charles M. Coleman, Morristown, N.J., assignor to
Warner-Lambert Pharmaceutical Company, Morris
Plains, N.J., a corporation of Delaware
No Drawing. Filed Oct. 1, 1964, Ser. No. 400,895
2 Claims. (Cl. 260—343.4)

This invention relates to phenolphthalein monophosphate salts having the structural formula:

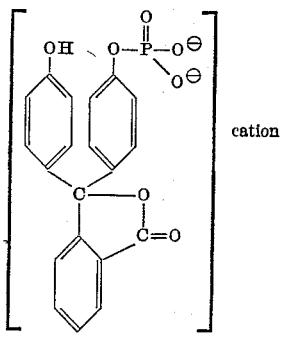

wherein the cations may be protonated amines such as cyclohexyl ammonium, tetramethylethylenediammonium, ethanolammonium, and the like. The total of the combined cation charges and those of the anionic phenolphthalein phosphate moiety are equal to each other. This invention also includes within its scope a novel process for the production of the above compounds as well as intermediates obtained during their synthesis.

The compounds of this invention are useful as substrates for the determination of phosphatase enzymes in procedures such as the determination of alkaline and acid phosphatases in blood serum and other biological materials of interest. They are advantageous over the known phenolphthalein diphosphate substrates because (1) the amount of phenolphthalein released by enzymatic hydrolysis of the monophosphate of this invention bears a linear relationship to the enzyme concentration, (2) the test is more rapid with the monophosphate of the invention, and (3) the test is more sensitive with the monophosphate of this invention. Moreover, these salts have a high degree of stability.

The compounds of this invention may be produced according to the following schematic diagram:

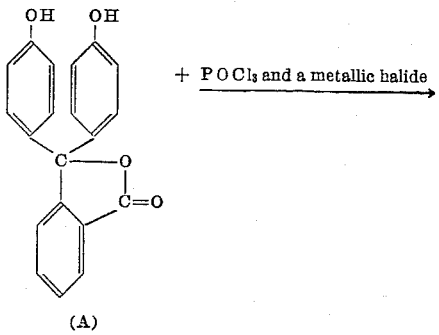

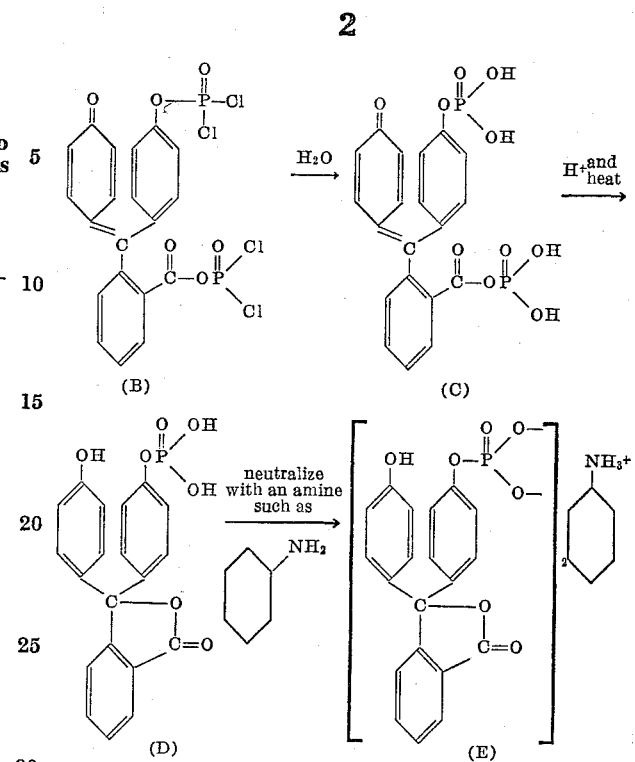

Typically, in the first step of the reaction above, 0.1 mol of phenolphthalein is mixed intimately with a finely pulverized metal halide salt such as sodium chloride. Next, ⅔ mol of an anhydride of phosphoric acid such as $POCl_3$ is added to the powdered mixture to convert the phenolphthalein to the acid anhydride derivative substituted on the carboxyl group (mixed anhydride) and on one phenolic group believed to have the structure (B). This reaction is effected by refluxing the reaction mixture for about 18 hours. The phenolphthalein oxyphosphoryl dichlorides (B) are rapidly hydrolyzed in ice water to give phenolphthalein diphosphoric acid in the quinoid form, one of the phosphoric acids combined as the acyl anhydride corresponding to the structure (C) which is further hydrolyzed by refluxing in an acidic medium or by saponification followed by acidification to give phenolphthalein monophosphoric acid.

If desired, the phenolphthalein monophosphate produced in this or any other manner may be separated from the impurities consisting of phenolphthalein diphosphate, phenolphthalein and phosphate ions by passing the solution through an anion exchange resin and eluting the materials on the column with an electrolyte. Thus, a solution containing highly purified phenolphthalein monophosphate may be obtained. However, it is often preferable to purify phenolphthalein monophosphate in the following manner. The pH of the reaction mixture is adjusted to a range from 2 to 7 with concentrated ammonium hydroxide and extracted with an organic immiscible solvent such as n-butanol. This causes the ammonium phenolphthalein monophosphate and free phenolphthalein to be extracted from the aqueous phase while contaminating ammonium phenolphthalein diphosphate is left in the aqueous phase. The pooled organic extracts are next extracted several times with a small volume of water maintained at pH 9.2 with a base such as sodium hydroxide. This allows the free phenolphthalein to remain in the butanol while the phenolphthalein monophosphate partitions into the aqueous phase. A concentrated strong acid such as HCl is added to the aqueous solution of the phenolphthalein monophosphate salt to precipitate out phenolphthalein monophosphoric acid as an oil. The amine salts of the phenolphthalein monophosphoric acid is formed by direct reaction with the amine, preferably in the range of 0° to 10° C. and preferably in a solvent such as ethanol.

While the above process is not only useful for the production of amine phenolphthalein monophosphate salts such as dicyclohexylammonium phenolphthalein monophosphate or di-ethanolammonium phenolphthalein monophosphate, it also provides a novel and convenient route for the production of sodium potassium or calcium phenolphthalein monophosphate salts.

The following example is included in order further to illustrate the invention.

*Example*

Mix 31.8 g. (0.1 mol) phenolphthalein intimately with 31.8 g. of finely ground sodium chloride and pour with a powder funnel into a 500 ml. round bottom distilling flask with a standard taper joint. Add 61 ml. POCl₃ (⅔ mol), fit reflux condenser on flask and reflux for 18 hours. Remove mixture from heat and hydrolyze the covalently bound chloride by cautiously adding with agitation a total of 300 g. of ice chips. Continue vigorous stirring until no more heat is evolved. Warm mixture to about 75° and agitate mixture vigorously for 5 minutes to completely hydrolyze the chloride anhydride. Cool mixture to about 4° C. or until the taffy-like mass is stiff and decant the aqueous phase without disturbing the organic phase. Add 200 ml. of 1 N HCl to the organic mass and reflux the two phase mixture for 30 minutes to hydrolyze the mixed acyl phosphate anhydride group. Cool mixture to about 4° C. and decant the aqueous phase. Add 150 ml. H₂O and dissolve the mixture by gently warming. Raise the pH of the mixture to 5.0 by careful addition of concentrated NH₄OH. Add sufficient n-butanol and water to make aqueous and butanol phases of 200 ml. each. Shake the two phases vigorously and remove the butanol phase. Repeat the extraction of the aqueous phase two more times. In each case check and readjust the pH to 5.0 with NH₄OH if necessary and adjust the volumes of the aqueous and butanol phases to 200 and 200 ml. respectively. Pool the butanol extracts and add 50 ml. of H₂O to the butanol extracts in a 1500 ml. beaker. Immerse pH electrodes into the two phase system, mix vigorously and raise the pH to 9.2 with concentrated NaOH. Separate the aqueous phase and repeat the extraction of the butanol four more times with 50 ml. portions of water, adjusting the pH if necessary. Add a volume of concentrated HCl, equal to the volume of the pooled aqueous extract, and shake vigorously to coalesce the organic precipitate. Cool the two phase system to 0°–5° C. and let the mixture stand at that temperature for at least 30 minutes. Decant the aqueous phase and remove the remaining aqueous droplets by blotting with filter paper. Add absolute ethanol to make 100 ml. of solution. Add cyclohexylamine with agitation to the ethanol solution in a vessel immersed in an ice bath until the pH of a portion of the precipitate transferred and dissolved in a small amount of H₂O is 9.6. Transfer the mixture to a Buchner funnel to remove the ethanol phase by vacuum filtration. Wash the cake twice with ice cold 50 ml. portions of absolute ethanol. Remove ethanol completely by drying under vacuum at room temperature. The optical density of an aqueous solution of the dicyclohexylammonium salt of the phenolphthalein monophosphate at a concentration of 2.8 mg./ml. at pH 10.0 is 0.28 at 435 mμ in a cell of 1 cm. path length when read against a water blank in a Beckman DB spectrophotometer. The compound is difficulty soluble in distilled deionized water but easily dissolves at pH 10 in 0.1 mol buffer consisting of sodium bicarbonate and sodium carbonate. The following curves show the infra-red spectrum of a Nujol solution of dicyclohexylammonium phenolphthalein monophosphate after being recrystallized twice from 95% ethanol: 2000 to 3700 cm.⁻¹ hydroxyl and amine; 1765 to 1740 cm.⁻¹ lactone; 1250 cm.⁻¹ lactone, phenol and phosphate; 1610 and 1510 cm.⁻¹ aromatic ring; 1100 cm.⁻¹ phosphate; 840 cm.⁻¹ 2 adjacent hydrogen on aromatic ring; 760–700 cm.⁻¹ peaks for 1,2 substitution on benzene ring. The compound melts with decomposition.

Analysis for $C_{32}H_{41}N_2O_7P$ (M.W.=596.6): Calc.: C, 64.34; H, 6.92; N, 4.71; O, 18.84; P, 5.19. Found: C, 62.76, H, 7.34; N, 4.69; O, 19.80; P, 5.41.

It is understood that the foregoing detailed description is given merely by way of illustration and that many variations may be made therein without departing from the spirit of my invention.

Having described my invention, what I desire to secure by Letters Patent is:

1. A compound of the formula:

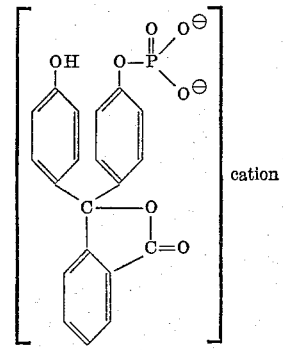

wherein the total charges of the phenolphthalein monophosphate moiety and the cations are of equal but of opposite sign to each other, said cation being a member selected from the group consisting of calcium, sodium, potassium, ammonium, cyclohexylammonium, tetramethylethylenediammonium, and ethanolammonium.

2. Dicyclohexylammonium phenolphthalein monophosphate.

References Cited

UNITED STATES PATENTS 2,117,291   5/1938   Britton et al. _____ 260—975
2,521,982   9/1950   Bell _____ 260—986

OTHER REFERENCES

Huggins et al.; J. Biol. Chem., vol. 159, pp. 399–401 (1945).

Kosolapoff: Organophosphorous Compounds (1950), pp. 346–47.

Wagner et al.: Synthetic Organic Chemistry (1953), pp. 496, 534.

ALEX MAZEL, *Primary Examiner.*

J. A. NARCAVAGE, *Assistant Examiner.*